(12) United States Patent
Ma et al.

(10) Patent No.: US 7,313,185 B2
(45) Date of Patent: Dec. 25, 2007

(54) SEQUENTIAL MOTION PATTERN REPRESENTATION

(75) Inventors: Yu-Fei Ma, Beijing (CN); Gu Xu, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 829 days.

(21) Appl. No.: 10/632,666

(22) Filed: Aug. 1, 2003

(65) Prior Publication Data

US 2005/0025242 A1 Feb. 3, 2005

(51) Int. Cl.
*H04N 7/12* (2006.01)

(52) U.S. Cl. ............ 375/240.16; 375/240; 375/240.01; 375/240.12

(58) Field of Classification Search ................ 375/240, 375/240.01, 240.12, 240.16; 382/236, 239
See application file for complete search history.

(56) References Cited

U.S. PATENT DOCUMENTS 6,101,276 A * 8/2000 Adiletta et al. ............. 382/236

6,782,135 B1 * 8/2004 Viscito et al. ............. 382/239

OTHER PUBLICATIONS

Tan, Y.P.; Saur, D.D.; Kulkarni, S.R.; Ramadge, P.J.; "Rapid Estimation of Camera Motion from Compressed Video with Application to Video Annotation"; Circuits and Systems for Video Technology, IEEE Transactions, 2000.
Sudhir, G.; Lee, J.C.M.; Jain, A.K.; "Automatic Classification of Tennis Video for High-Level Content-based Retrieval" IEEE Multimedia, 1997.
Xu, P.; Xie, L.; Chang, S.F.; Divakaran, A.; Vetro, A.; Sun, H.; "Algorithms and Systems for Segmentation and Sturcture Analysis in Soccer Video"; IEEE International Converence on Multimedia and Expo; 2001.
Zhou, W.; Vellaikal, A.; Jay Kuo, C.C.; "Rule-based Video Classification System for Basketball Video Indexing" Proceedings on ACM Multimedia 2000 Workshops; 2000.

* cited by examiner

*Primary Examiner*—Allen Wong
(74) *Attorney, Agent, or Firm*—Lee & Hayes, PLLC (57) ABSTRACT

Systems and methods for representing sequential motion patterns are described. In one aspect, video frames are converted into a sequence of energy redistribution measurements. One or more motion filters are then applied to the ER measurements to generate one or more temporal sequences of motion patterns, the number of temporal sequences being a function of the number of motion filters.

30 Claims, 8 Drawing Sheets

SEQUENTIAL MOTION PATTERN REPRESENTATION

TECHNICAL FIELD

The invention pertains to video processing.

BACKGROUND

Video motion provides useful cues in understanding video content. As a result, research efforts are increasingly relying on semantic event analysis to obtain video structures and indices. As one of important cues for semantic event analysis, compact and effective motion representation is indispensable for video analysis, especially for sports videos. However, conventional semantic video analysis techniques do not adequately utilize video motion information due to its complexities and the lack of effective motion representations. As a result many video motion events go undetected and unanalyzed.

SUMMARY

Systems and methods for representing sequential motion patterns are described. In one aspect, video frames are converted into a sequence of energy redistribution (ER) measurements. One or more motion filters are then applied to the ER measurements to generate one or more temporal sequences of motion patterns, the number of temporal sequences being a function of the number of motion filters.

BRIEF DESCRIPTION OF THE DRAWINGS

In the figures, the left-most digit of a reference number identifies the particular figure in which the referenced feature first appears.

FIGS. 4-6 show an exemplary set of video frames, exemplary motion filters that have been applied to calculate motion energy redistributions associated with respective ones of the frames, and resulting filtering responses, or "temporal sequences". In particular.

DETAILED DESCRIPTION

Overview

Conventional semantic video analysis techniques do not adequately represent the spatio-temporal complexities of video motion information. As a result many video motion events go undetected and unanalyzed. To address this problem, systems and methods of the invention convert the video sequence into a sequence of energy redistribution. A number of motion filters are generated according to the primary motion in the video, wherein each motion filter is responsive to a particular type of dominant motion. The motion filters are applied the motion energy redistribution sequence of the video. This converts the energy measurements into a temporal sequence of filter responses (i.e., sequential signal responses) in which distinct temporal motion patterns corresponding to high-level concepts are present. In this manner, the spatio-temporal aspects of sequential motion are represented. Such a representation can be analyzed by sequential processing methods, for semantic motion pattern event recognition.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

Figure 1:
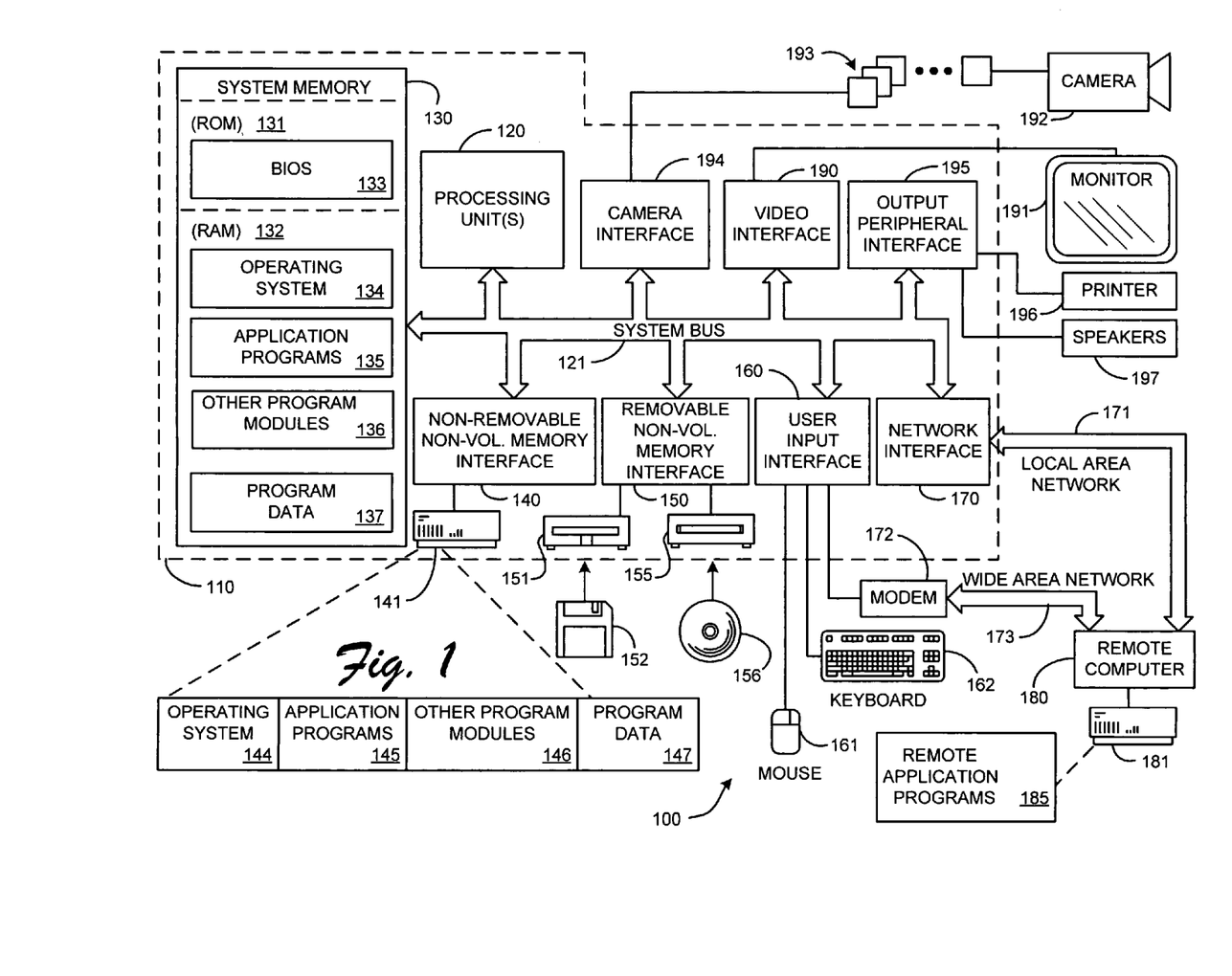
FIG. 1 is a block diagram of an exemplary computing environment within which systems and methods for representing sequential motion patterns may be implemented.

FIG. 1 illustrates an example of a suitable computing environment 100 on which the subsequently described systems, apparatuses and methods for representing sequential motion patterns may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for representing sequential motion patterns includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that they are at least different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 may also be included as an input device to the computing device 110. Further, while just one camera is depicted, multiple cameras could be included as input devices to the computing device 110. The images 193 from the one or more cameras 192 are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from peripheral devices different than a camera 192, for example via any of the aforementioned computer-readable media.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. The network connections shown are exemplary and other means of establishing a communications link between the computers may be used.

Exemplary Program Modules and Data

Figure 2:
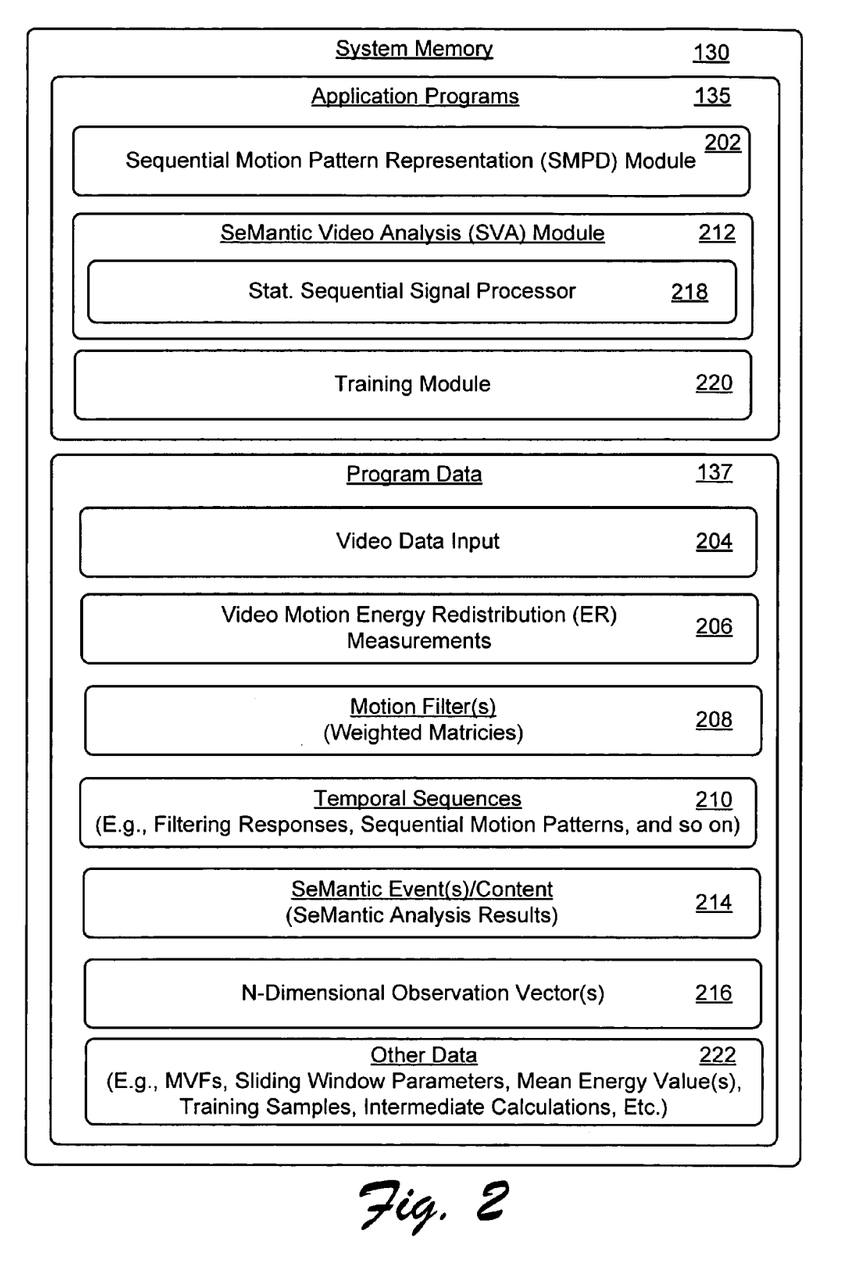
FIG. 2 shows computer-program module and program data aspects of the system of FIG. 1 for representing sequential motion patterns.

FIG. 2 shows computer-program module and program data aspects of the system of FIG. 1 for representing sequential motion patterns. For purposes of discussion, the features of FIG. 2 are described while referring to one or more features of FIG. 1. In particular, FIG. 2 shows that application programs 135 portion of the system memory 130 includes, for example, sequential motion pattern representation ("SMPR") module 202. The SMPR module 202 processes input video data 204 to represent motion between video frames as energy redistribution ("ER") measurements(s) 206. The SMPR module 202 then utilizes one or more motion filters 208 to convert the ER measurements 206 into temporal sequences 210 representing sequential motion patterns.

Energy Redistribution Between Video Frames

Figure 3:
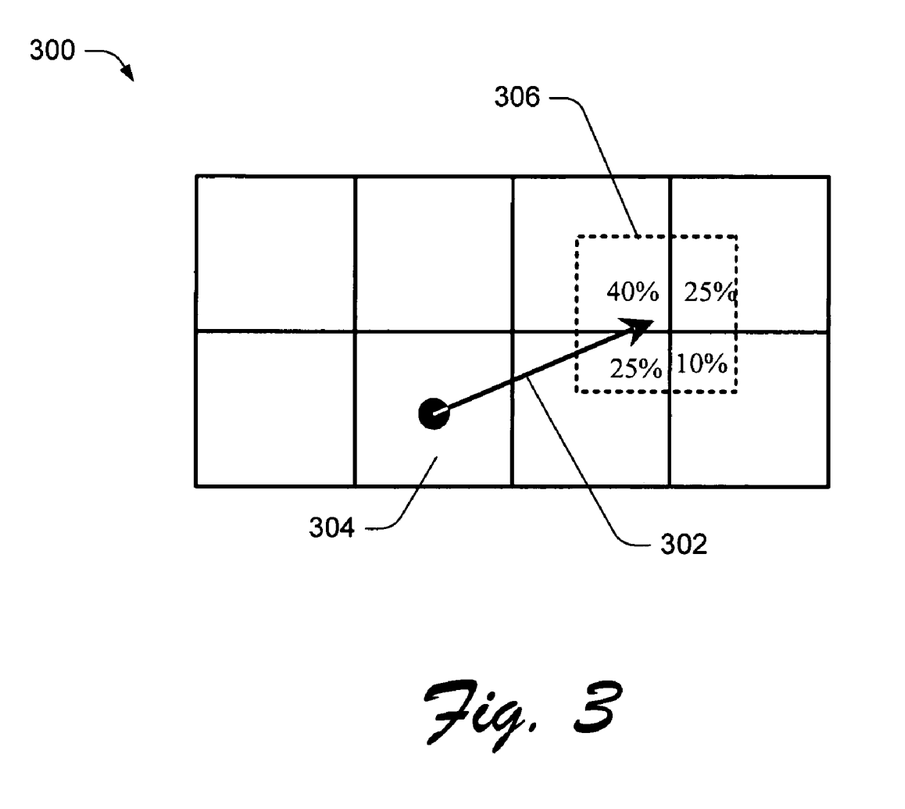
FIG. 3 shows an exemplary video set of video frames with a motion vector field indicating a redistribution of energy from one frame to another frame.

FIG. 3 shows an exemplary video set of video frames 300 with a motion vector field ("MVF") 302 indicating a redistribution of motion energy from one frame to another frame. Usually, each frame is divided into N×M blocks. Each block has one motion vector which indicates the displacement of this block between the two consecutive frames. All motion vectors in a frame constitute a MVF. An MVF is considered an outside force that causes energy exchange between video frames. For this reason, each block when using a block-based motion estimation algorithm (e.g., block 306—delimited with dashed lines) is viewed as a basic energy container. The change of energy distribution indicated by an MVF is determined to exhibit motion features. In this implementation, all blocks in an initial frame are considered to have the same amount of energy. The redistribution of energy, as illustrated via the respective energy distribution percentages of block 306 show energy distributions of 40%, 25%, 25%, and 10%.

Referring to FIG. 2, to generate the video motion ER measurements 206, the SMPR module 202 derives MVFs between video frames. For purposes of discussion, the MVFs are represented in respective portions of "other data" 222. Energy distributions depend only on the position of corresponding block in the next video frame. For example, energy at block (x, y) is denoted by $E_{x,y}$. An energy distribution update function changes energy distribution in each block by enforcing the functions of MVF. When a new MVF is considered, the energy in the blocks is calculated by equation (1), below. Therefore, the energy values computation in blocks can be viewed as an updating process, exemplified with the following equation:

$$E'_{x,y} = \frac{\sum_{i,j}(overlapS_{i,j,x,y} \times E_{i,j})}{W_b^2}, \, i, j \in [1, W_b]. \tag{1}$$

In equation (1), overlap $S_{i,j,x,y}$ denotes the overlap portion of the rectangular region corresponding to block (i, j) in a previous frame and block (x, y) in current frame. $W_b$ represents the size of blocks. If blocks move out of frame boundary, the blocks are placed just in frame by decreasing the magnitude of the MVF to keep the amount of energy within the frame.

In particular, the SMPR module 202 uses a sliding window to calculate each respective ER measurement 206 for each frame of the video 204. Each frame is added into the sliding window one by one, until the last frame in the window reached. This process produces the sequence of energy redistribution measurements 206. With respect to configuring the sliding window, the energy distribution in the first frame of the sliding window is evenly assigned. For example, in one implementation, energy values in all blocks are assigned a value of one (1). Accordingly, the "initial frame", as mentioned above, is the first frame, whose energy values are fabricated. This provides a reasonable assumption without biases.

The width w of the sliding window and the sampling frequency v—defined by the number of skipped frames when the window slides, are configurable parameters that can be changed to achieve desired accuracy of the results. That is, the computation complexity and the performance of the procedure to represent sequential motion patterns in video data can be configured by adjusting these two parameters, both of which are represented in respective portions of "other data" 222.

For example, the larger the size of the sliding window is, the more the computations in each frame involves. Similarly, the high the sampling frequency is, the higher the computational complexity of sequential curves generation is. However, the final event recognition accuracy may decrease if the sliding window size is too small or the sampling frequency is too low. Consequently, a trade-off between the accuracy and the computational complexity according to the different application scenarios can be made. This implementation of the system is not sensitive to the two parameters.

In this implementation, each MVF is determined by known block-based motion estimation algorithms (BMA). Though the real motion often cannot be obtained by BMA, the loss has been determined to be very small (i.e., trivial), as compared to the efficiency of not utilizing BMAs, especially when the input video data 204 is in a Moving Pictures Expert Group ("MPEG") data format, or some other data format, wherein MVFs are readily available. When the input video data 204 is in a data format wherein MVFs are not readily available, the MVFs can be determined via any motion estimation algorithms, such as traditional block-based motion estimation algorithms.

Motion Filtering to Identify Motion Types from Frame Energy Redistributions

Energy redistribution function (1), as described above, provides a way to represent motion between two frames. The SMPR module 202 then processes the ER measurements 206 to characterize them as pertaining to one or more particular types of motion in a spatio-temporal data format. To this end, the SMPR module 202 applies a number of motion filters 208 to the ER measurements 206 to generate temporal motion pattern 210 responses. A motion filer 208 is a respective weight matrix with the same dimensions as the number of blocks in a frame of video data input 204. By arranging the weights of a motion filter's corresponding matrix with different values and/or value ordering, the filter designer changes the sensitivity of the motion filter to different motion forms. In other words, a weight matrix can be designed to specifically identify a particular type of motion.

Elements in a weight matrix (i.e., motion filter 208) are denoted by $W_{x,y}$. Subsequent to calculation of an ER-measurement 206 from respective ones of the video frames, as discussed above, the SMPR module 202 applies each such motion filter 208 to the ER measurement. The resulting temporal energy response of the frame is defined as follows:

$$E_R = \sum_{i,j} E_{i,j} \times w_{i,j} \quad i, j \in [1, W_b]. \quad (2)$$

Over time, responses calculated via equation (2) quantitatively represent corresponding motion events. A combination of energy responses produced via a particular one motion filter 208 generates a respective sequential motion curve, or temporal sequence 210.

Figure 4:
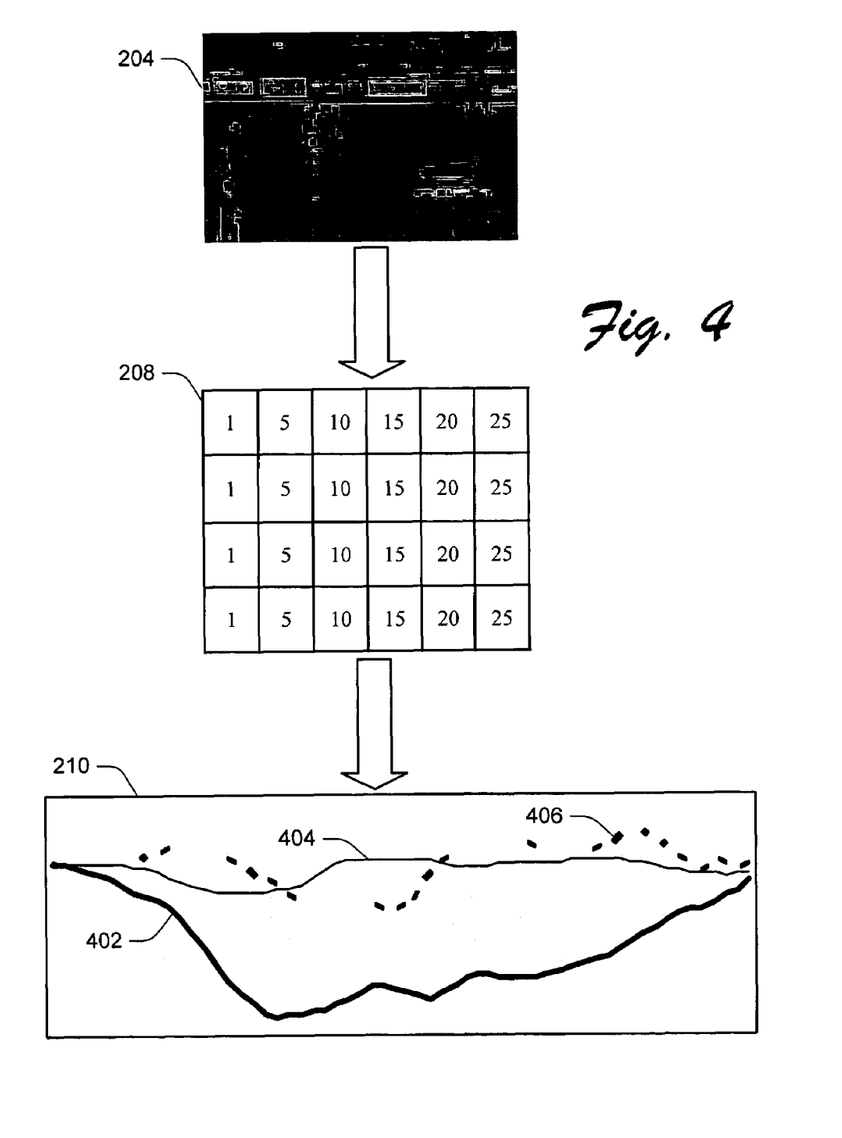
FIG. 4 shows an exemplary input video frame, an exemplary motion filter that was specifically designed to detect horizontal motion, and three temporal sequences, of which the bolded temporal sequence (a single dimension of an n-dimensional observation vector) was derived via application of the exemplary motion filter.
Figure 5:
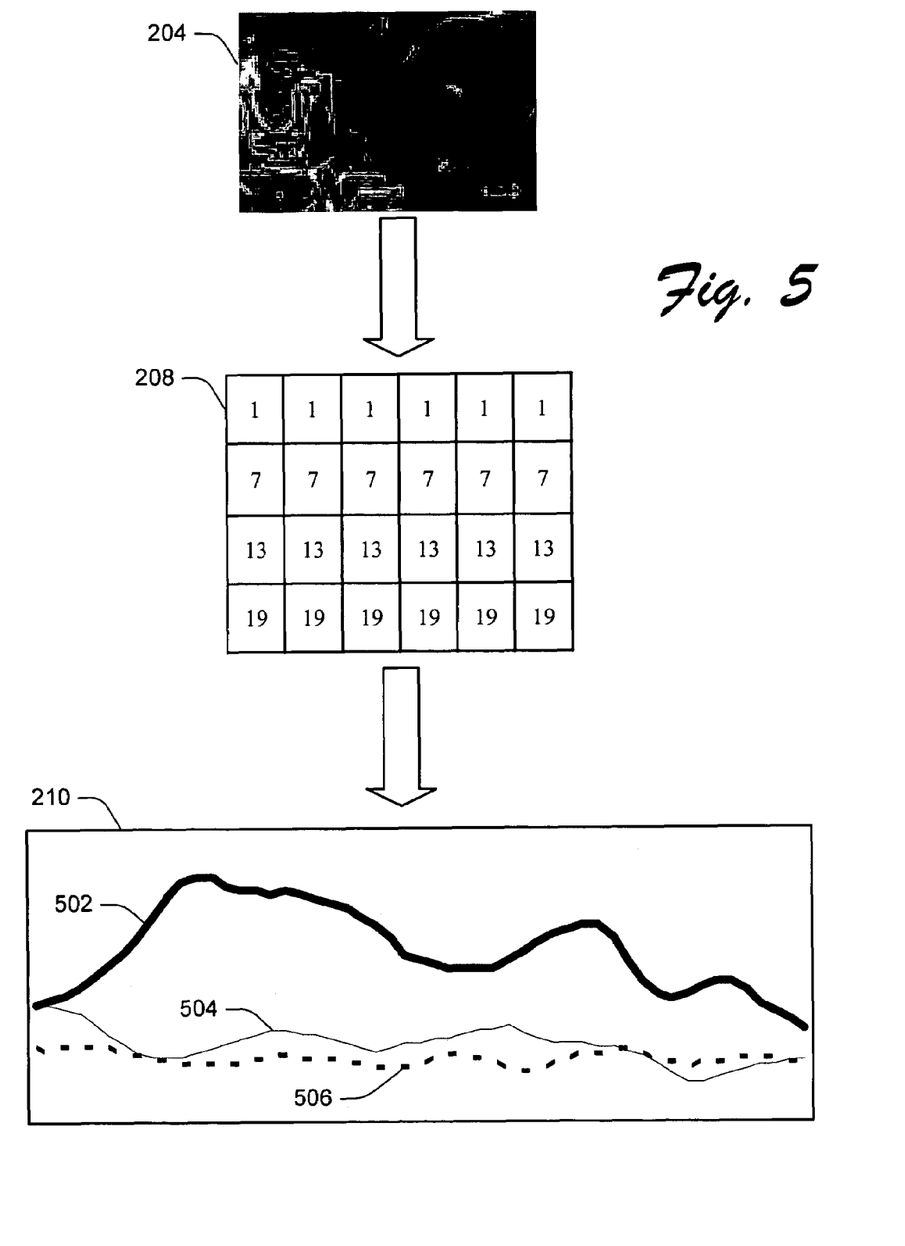
FIG. 5 shows an exemplary input video frame, an exemplary motion filter that was specifically designed to detect vertical motion, and three temporal sequences, of which the bolded temporal sequence (a single dimension of an n-dimensional observation vector) was derived via application of the exemplary motion filter.
Figure 6:
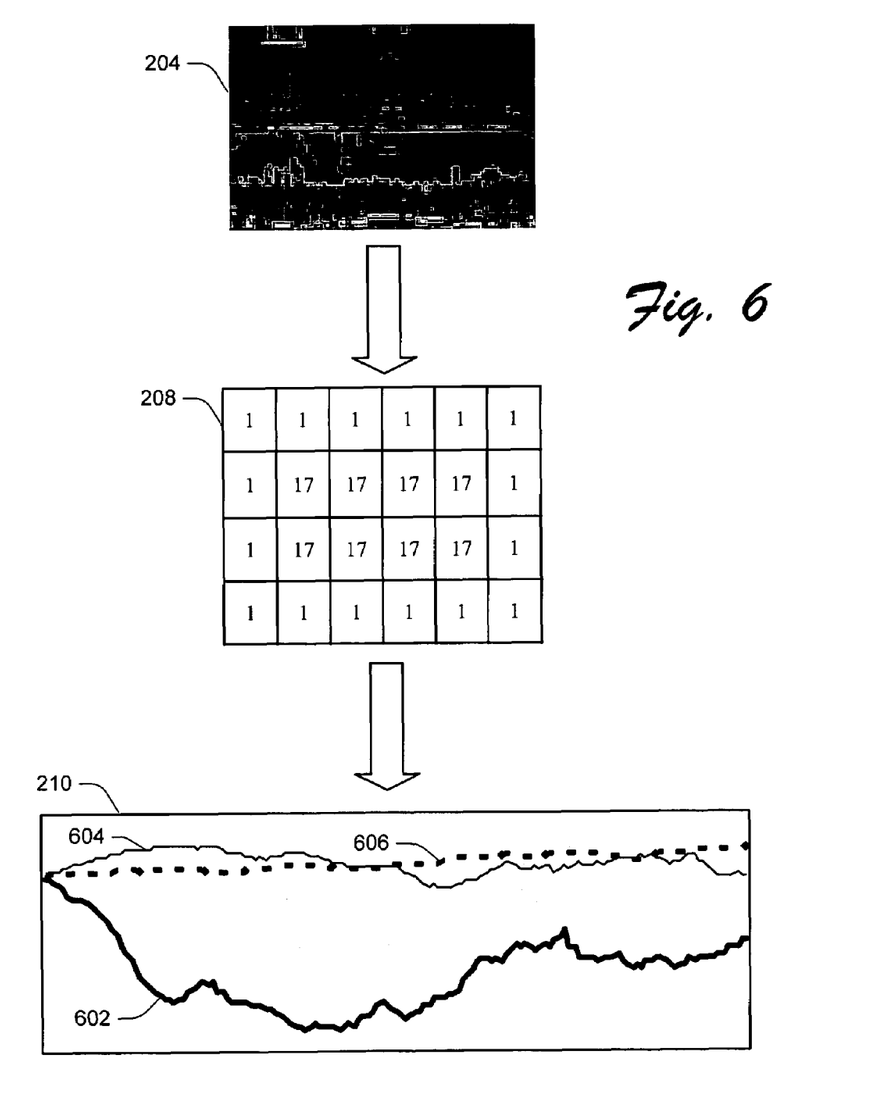
FIG. 6 shows an exemplary input video frame, an exemplary motion filter that was specifically designed to detect radial motion, and three temporal sequences, of which the bolded temporal sequence (a single dimension of an n-dimensional observation vector) was derived via application of the exemplary motion filter.

FIGS. 4-6 show a. exemplary set of video frames 204, exemplary motion filters 208 that have been applied to calculated motion energy redistributions 206 associated with respective ones of the frames, and resulting filtering responses, or "temporal sequences" 210. In the figures, the left-most digit of a reference number identifies the particular figure in which the referenced feature first appears. Thus, a frame 204 represents a portion of the video data input 204 of FIG. 2, a motion filter 208 is a motion filter 208 of FIG. 2, and so on. The figures illustrate that the temporal sequences for each frame will contain the same number of sequential feature curves as the number of motion filters 208 that have been applied to the ER measurements 206 associated with the frame.

In this implementation, the number of motion filters 208 applied to the ER measurements 206 is three (3). Thus, each graph illustrates 3 sequential feature curves. A crest on a curve indicates the presence and direction of a certain type of motion—the particular type of motion being a function of the values in the respective weighting matrix utilized to generate the curve. Although only 3 motion filters are utilized in the examples of FIGS. 4-6, any number of motion filters can be designed and applied to the frames, the number being a function of the different types of motion that are to be characterized. For instance, if the input video data 204 is a sport video, the specific types of motion corresponding to the sport video can be represented by respective ones of the motion filters 208. The bold curve in each respective graph has been generated by applying a particular type of motion filter 208 to the corresponding video frame. The type and shape of the crests identify the direction and characteristics of the identified motions. For instance, FIGS. 4-6 provide three examples of how type and shape of the crests can identify direction and characteristics of the identified motions—i.e. passing a ball (horizontal motion), panning up (vertical motion), and zoom-out (radial motion).

Referring to FIG. 4, there is shown, an exemplary input video frame (one frame of input video data 204), an exemplary motion filter 208 specifically designed to detect horizontal motion, and three temporal sequences 410, of which the bolded temporal sequence was derived via application of the exemplary motion filter 208. FIG. 5 shows an exemplary input video frame (one frame of input video data 204), an exemplary motion filter 208 specifically designed to detect vertical motion, and three temporal sequences 410, of which the bolded temporal sequence was derived via application of the exemplary motion filter 208. FIG. 6 shows an exemplary input video (one frame of input video data 204), an exemplary motion filter 208 specifically designed to detect radial motion, and three temporal sequences 410, of which the bolded temporal sequence was derived via application of the exemplary motion filter 208. Referring to any of FIGS. 4-6, notice that the number of sequential feature curves (temporal sequences 210, or filter responses) is equal to three (3), which matches the number of motion filters 208 that have been applied in this implementation to calculated ER measurements 206 associated with a sequence of frames—of which the corresponding frame 204 is but one exemplary frame. That is, the frames 204 in FIGS. 4, 5, 6 represent a key frame or representative frame of the three typical motions or slips, respectively, which are used to display the content of sample clips to users.

N-Dimensional Observation Vectors

For each temporal sequence 210 associated with a respective motion filter 208, the SMPR module 202 calculates a respective mean energy value of the temporal sequence 210. The mean energy is the average energy within the sliding window. Such even energy is considered to be smoother, and thus provide a more accurate representation of the individual frame's energy for a statistical method. Such mean energy values are represented via respective portions of "other data" of FIG. 2. To represent the motion of the frame sequence in the window, the SMPR module 202 combines the mean energy values to create an observation vector 216. The observation vector is n-dimensional, wherein n is the number of motion filters 208 multiplied by a factor of two (2). For example, if there are 3 original curves generated by motion filters, the corresponding 3 difference curves are computed as the difference between the consecutive values. Both the original curves and the difference curves work as the input of HMM. The factor represents both original input and difference temporal sequences 210 generated by SMPR module 202 when determining the ER measurements 206.

For instance, in the examples of FIGS. 4-6, three (3) motion filters 208 are utilized. So, 3 original and 3 difference temporal sequences 210 are combined into a six-dimension observation vector. Thus, any one of the bolded temporal sequences 210 of FIGS. 4-6 is representative of the information utilized to calculate a single dimension of an n-dimensional observation vector. In this example, bolded curves indicate the most responsive curves according to the different motion filters, respectively. FIGS. 4-6 show the 3 original curves which are computed by three motion filters.

In this manner, ER measurements 206 are calculated from video frame sequences. Motion filters 208 designed to detect specific types of motion are applied to the ER measurements 206 to generate temporal sequences 210. The temporal sequences 210 represent sequential motion patterns across the video data. Mean energy values of the temporal sequences 210 are determined to generate an n-dimensional observation vector 216 to represent the sequential motion patterns in the video.

Semantic Characterization of an N-Dimensional Observation Vector

Referring to FIG. 2, application programs 135 further includes semantic video analysis ("SVA") module 212 to evaluate the observation vector(s) 216 and characterize/map at least a subset of the information contained in the vectors as representative of specific semantic events/content 214. In this implementation, statistical sequential signal processing (SSSP) module 218 uses a single Gaussian Hidden Markov Model (HMM), although other statistical sequential signal processing SSSP techniques such as Time-Delayed Neural Networks, Dynamic Bayesian Network, and/or the like, could have also been used. A HMM is a statistical model for analysis of sequential data. Statistical models for sequential data such as the continuous single Gaussian HMM are known and often used in speech recognition technology, not in semantic video content analysis. To provide such a novel framework, shots extracted from an input video sequence 204 are considered as analogous of sentences in speech, and event clips are considered as representative of words. Relationships between the energy values indicated by the n-dimensional observation vector(s) 216 and actual semantic events are thus determined via sentence grammar rules. Thus, the complete connected HMMs will have n-states; one-state for each dimension of the n-dimension observation vector and begin and exit states.

Training the HMMs

Figure 7:
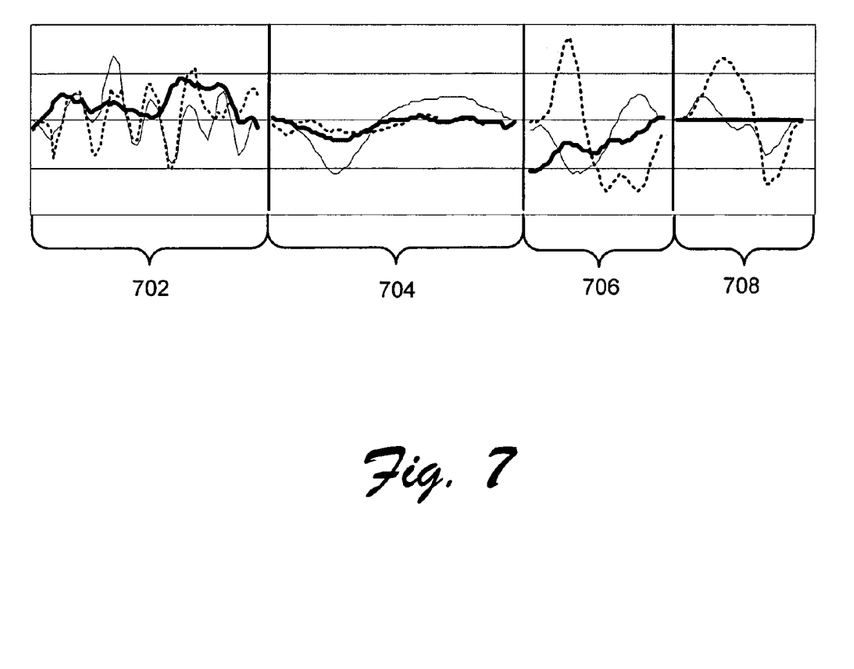
FIG. 7 shows exemplary correspondences between a number of semantic or conceptual events (training samples) and automatically detected motion patterns (temporal sequences) from a basketball video.

FIG. 7 shows exemplary correspondences between a number of semantic or conceptual events (training samples) and automatically detected motion patterns (temporal sequences 216) from a basketball video 204. Portion 702 of FIG. 7 indicates temporal sequences 210 that map to a basketball game tracking concept. Portion 704 indicates temporal sequences 210 that maps to a lay-up concept. Portions 706 and 708 indicate two respective portions of the temporal sequences 210 that respectively map to different types of "wipe". A wipe is a kind of shot transition. Two shots can be connected in numerous ways including cut (abrupt transition, without any additional information), dissolve (gradual transition), fade-in/fade-out, and wipe. (There usually is an overlay sub-image flying through the scene). As shown, such correspondences or characterizations are a function of the detected motion events and the subject matter represented by the video. Other types of conceptual categories that could be defined in an exemplary implementation of the described systems and methods for representing sequential video motion patterns in a video of a basketball game include, for example: team offence at left or right court, fast break to the left or right, lay-up at left/right court, shot at left/right court, tracking player to left/right, lay-up in close-up view, shot/foul shot in close-up view, close-up, wipe, stillness, and so on.

Representative semantic events, such as the exemplary events listed above for a sports event, are each characterized as a "minimal recognition unit" (MRU), each event being substantially self-contained so that the event can be characterized by the statistical model as a respective grammatical sentence(s). Training module 220 is used to train the HMM for each MRU such that shot transcriptions are manually prepared based on defined events. In one implementation, to avoid over segmentation resulting in short segments that could be meaningless for human understanding, we define and apply a number of post-processing rules.

Post-processing rules are defined according to specific applications. For example, in Basketball video analysis, the rules may be listed as follows:

1) If the duration is less than 15 frames, marked as an invalid concept.
2) If the invalid concept is "tracking", the label is changed to "close-up".
3) If the invalid concept is "fast break", nearby labels will be error in half-court for following semantic net. The issue occurs in two cases: correction (prior error) and mistake (posterior error). We search up from the next to find the first attachable label and search down from the previous. Determine the error type by minimal distance and change labels to proper half-court.
4) If the invalid concept is the others, merge it to the next label simply.
5) Merge same labels adjacent, except "layup".

Semantic Event Recognition

The SVA module 204 recognizes semantic events at the shot level. Event transcription for each shot is provided by the SSSP module 218, which in this implementation utilizes HMMs. To this end, a complete connected HMM will have n-states; one-state for each dimension of the n-dimension observation vector 216, as well as begin and exit states. All events are context dependent. Relationships between the energy values indicated by the n-dimensional observation vector(s) 216 and actual semantic events are determined via sentence grammar rules. For instance, shots extracted from the input video data 204 are considered analogous of sentences, and event clips are considered representative of words. Shot transcriptions are manually prepared based on defined events and the transition probabilities are calculated as follows:

$$p(i, j) = N(i, j)/N(i) N(i) \neq 0 \quad (3),$$

wherein $N(i)$ is the total number of occurrences of event i, $N(i,j)$ is the total number of co-occurrences of event i and j.

The SVA module 212 utilizes a known Viterbi algorithm to segment the segments shots by the maximum likelihood estimation; the transition probabilities represent a kind of the posterior probability. (Probabilities are represented as respective portions of "other data" 222). A product of the two probabilities is a final recognition probability. Finally, the concept transcription with the maximal recognition probability is regarded as the result—i.e., the semantic events/content 214.

An Exemplary Procedure

Figure 8:
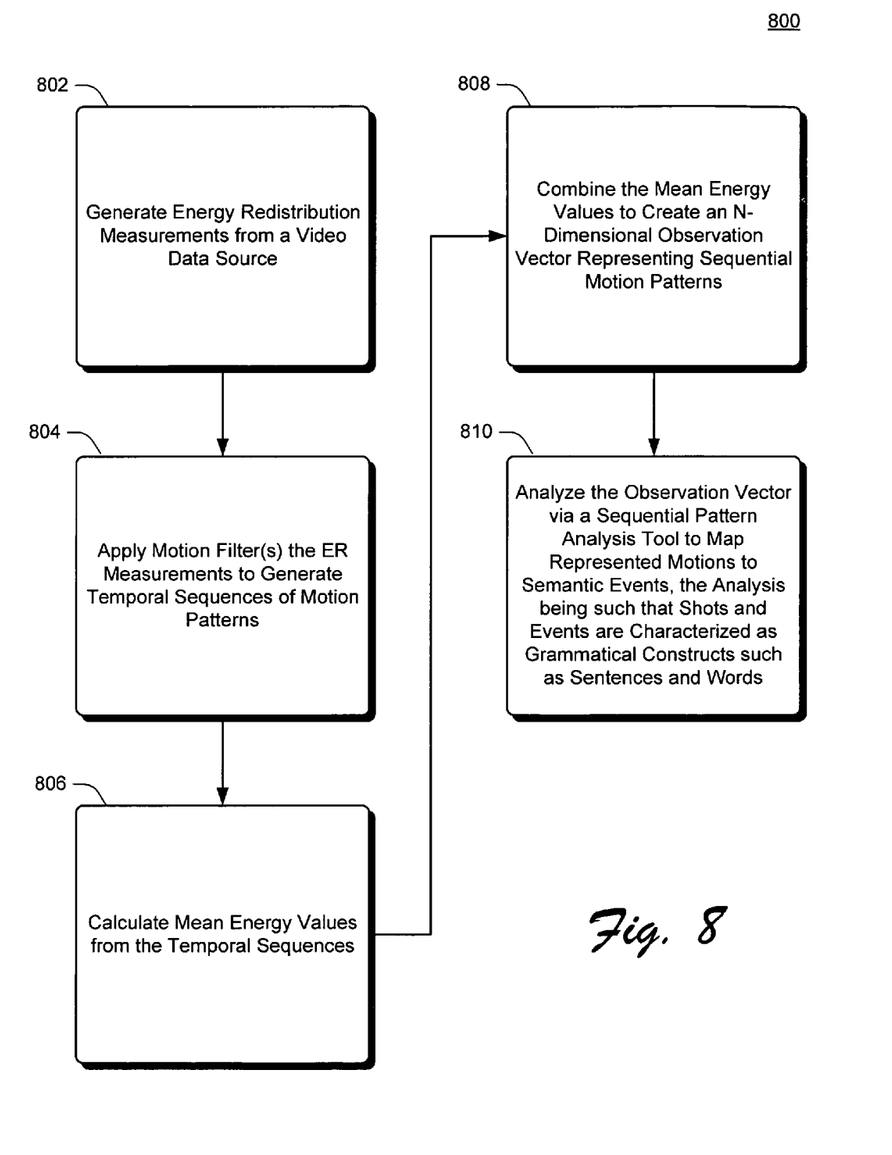
FIG. 8 shows an exemplary procedure for representing sequential motion patterns from a video data source with an n-dimensional observation vector. A statistical model for sequential pattern analysis is applied to the represented motion patterns to map semantics to the represented motion events.

FIG. 8 shows an exemplary procedure 800 for representing sequential motion patterns in a video data source 204 as an n-dimensional observation vector 216. A statistical model for sequential pattern analysis is applied to the represented motion patterns to map semantics to the represented motion events. For purposes of discussion, the operations of the procedure are also described in reference to the features of FIGS. 1 and 2. For purposes of discussion, the operations of blocks 802 through 808 of the procedure are implemented by the SMPR module 202, whereas operations of block 810 are implemented by the SVA module 212. However, in a different implementation, these operations can be collectively or independently implemented by any combination of one or more computer-program modules (e.g., the SMPR module and/or the SVA module 212).

Referring to FIG. 8, at block 802 the SMPR module 202 (FIG. 2) uses a sliding window to apply each motion filter 208 to the input video sequence 204 to generate ER measurements 206 according to equation (1). At block 804, the SMPR module 202 applies each motion filter 208 to the energy redistribution measurements 206. This produce the temporal motion sequences 210 according to equation (2). The temporal sequences represent motion events quantitatively. At block 806, the SMPR module 202 calculates, for each motion filter applied to the ER measurements 206, a respective mean of the energy value sequence generated by application of the filter. At block 808, the SMPR module 202 combines the mean energy values into an n-dimensional observation vector, wherein n is the number of motion filters 208 multiplied by a factor of two (2) to indicate consideration of original input and difference temporal sequences 210. At block 810, the SVA module 212 analyzes the n-dimensional observation vectors(s) via the sequential pattern analysis module 218, which in this implementation utilizes HMMs, to map the semantic events to the motion patterns represented in the observation vector 216.

CONCLUSION

The described systems and methods represent sequential motion patterns. Although the systems and methods have been described in language specific to structural features and methodological operations, the subject matter as defined in the appended claims are not necessarily limited to the specific features or operations described. For instance, represented sequential motion patterns have been described as having been derived from a video data input source 204. However, the described systems and methods for representing sequential motion patterns by calculating energy redistribution (ER) between representative components, and generating an n-dimensional observation vector by applying motion specific filters to the ER calculations, can be applied to other spatio-temporal data sources such as the object trajectories in 2D+t space and the sequence of color histogram difference. Moreover, although HMMs were used to map the represented motion patterns to semantic events, other sequential analysis tools could also have been used. Accordingly, the specific features and operations are disclosed as exemplary forms of implementing the claimed subject matter.

The invention claimed is:

1. A method implemented at least in part by a computing device for representing sequential motion patterns, the method comprising:
   converting video frames into a sequence of energy redistribution ("ER") measurements;
   applying one or more motion filters to the ER measurements to generate a number of temporal sequences of motion patterns, the motion patterns being in a spatio-temporal data format, the number being a function of how many motion filters were applied to the ER measurements; and
   wherein converting further comprises determining a change in energy distribution between multiple ones of the video frames via respective motion vector fields (MVFs), the video frames being within a sliding window of the video frame.

2. The method of claim 1, wherein each motion filter of the one or more motion filters is a weighting matrix of values designed to identify a particular type of motion.

3. The method of claim 1, wherein converting further comprises configuring a width and/or frame frequency sampling parameter associated with the sliding window to adjust computational complexity and/or performance of the method.

4. The method of claim 1, wherein energy at block (x, y) of a frame of the video sequence is denoted by $E_{x,\ y}$, and wherein converting further comprises determining a change in energy distribution E' between the block (x, y) and block (i, j) in a previous frame of the video sequence as a function of:

$$E'_{x,y} = \frac{\sum_{i,j}(overlapS_{i,j,x,y} \times E_{i,j})}{W_b^2}, \ i, j \in [1, W_b]; \text{ and}$$

wherein overlap $S_{i,\ j,\ x,\ y}$ denotes an overlap portion of a rectangular region corresponding to block (i, j) and block (x, y), and $W_b$ represents block size.

5. The method of claim 4, wherein converting further comprises, if a block is not in a frame boundary, placing the block within the frame boundary by decreasing a magnitude of a corresponding motion vector field.

6. The method of claim 4, wherein each motion filter is a respective weighting matrix of values, elements of each weighting matrix being denoted as $w_{i,\ i}$, and wherein applying further comprises calculating an ER measurement from respective ones of the video frames such that resulting temporal energy responses $E_R$ are determined according to:

$$E_R = \sum_{i,j} E_{i,j} \times w_{i,j} \ i, j \in [1, W_b]; \text{ and}$$

wherein, $E_{i,\ j}$ denotes the energy distributed in each block (i, j), and $W_b$ represents block size.

7. The method of claim 1, further comprising:
   for each motion filter, identifying a respective mean energy value of a temporal sequence associated with the motion filter; and
   combining respective mean energy values to create an n-dimensional observation vector; the n-dimensional observation vector representing ER responses to each of the motion filters and original input and difference temporal sequences.

8. The method of claim 7, further comprising analyzing the n-dimensional observation vector with a statistical sequential pattern analysis tool to map the motion patterns to semantic events associated with the video frames.

9. The method of claim 8, wherein statistical sequential pattern analysis tool is based on Hidden Markov Models.

10. A computer-readable medium encoded with a computer program including computer-executable instructions for performing operations of the method of claim 1.

11. A computing device comprising a computer-readable medium encoded with a computer program including computer-executable instructions for performing operations as recited in the method of claim 1.

12. A computer-readable medium encoded with a computer program including computer-executable instructions for representing sequential motion patterns, the computer-program instructions being executable by a processor for:

generating one or more motion filters according to respective ones of primary motions in a video sequence, each of the motion filters being responsive to a particular one dominant motion of the primary motions;

calculating energy redistribution measurements between respective frames of the video sequence, the respective frames being determined by a sliding window of video frames of the video sequence;

converting the energy redistribution measurements into temporal sequences showing distinct motion patterns, each temporal sequence being generated responsive to application of a particular one of the motion filters to the energy redistribution measurements;

wherein the temporal sequences represent high-level spatio-temporal motion patterns of the video wherein converting further comprises: determining that a block is not in a frame boundary associated with frames of the video sequence; and responsive to the determining, placing the block within the frame boundary by decreasing a magnitude of a corresponding motion vector field.

13. The computer-readable medium of claim 12, wherein each motion filter is a weighting matrix of values designed to identify a particular type of motion.

14. The computer-readable medium of claim 12, wherein energy at block (x, y) of a frame of the video sequence is denoted by $E_{x,y}$, and wherein calculating further comprises determining a change in energy distribution E' between the block (x, y) and block (i, j) in a previous frame of the video sequence as a function of:

$$E'_{x,y} = \frac{\sum_{i,j}(overlapS_{i,j,x,y} \times E_{i,j})}{W_b^2}, \ i,j \in [1, W_b]; \text{ and}$$

wherein overlapS$_{i, j, x, y}$ represents an overlap portion of a rectangular region corresponding to block (i, j) and block (x, y), and $W_b$ represents block size.

15. The computer-readable medium of claim 12, wherein each motion filter is a respective weighting matrix of values, elements of each weighting matrix being denoted as $w_{i,j}$, and wherein applying further comprises calculating an ER measurement from respective ones of the video frames such that resulting temporal energy responses $E_R$ are determined according to:

$$E_R = \sum_{i,j} E_{i,j} \times w_{i,j} \ \ i, j \in [1, W_b]; \text{ and}$$

wherein, $E_{i,j}$ denotes the energy distributed in each block (i, j), and $W_b$ represents block size.

16. The computer-readable medium of claim 12, wherein the computer-executable instructions further comprise instructions for:

identifying, for each motion filter, a respective mean energy value of a sequence of the temporal sequences associated with the motion filter;

combining respective mean energy values to create an n-dimensional observation vector; the n-dimensional observation vector representing energy redistribution responses to each of the motion filters and original input and difference temporal sequences.

17. The computer-readable medium of claim 16, wherein the computer-executable instructions further comprise instructions for analyzing the n-dimensional observation vector with a statistical sequential pattern analysis tool to map the motion patterns to semantic events associated with the video frames.

18. The computer-readable medium of claim 17, wherein statistical sequential pattern analysis tool is based on Hidden Markov Models.

19. The computing device comprising the processor coupled to the computer-readable medium of claim 12.

20. A computing device comprising:

a processor; and a computer-readable medium coupled to the processor, the computer-readable medium being encoded with at least one computer program including computer-executable instructions that when executed by the processor perform operations for:

deriving motion vector fields (MVFs) between frames of a video sequence as a function of a sliding window comprising a configurable number of the frames, each MVF representing an energy distribution between a particular block in a first frame of the frames and a different block in a second frame of the frames that is adjacent to the first frame;

modifying content of the sliding window to include a new frame of the frames;

responsive to modifying the content, updating, the represented energy distributions for each block, the updating being based on an overlap portion of the block and a previous block of a previous frame of the frames; and motion filtering the energy distributions to sequentially represent one or more motion types presented by the video sequence over time, the one or more motion types identifying one or more sequential motion patterns of the video sequence.

21. The computing device of claim 20, wherein the computer-executable instructions for updating further comprise instructions for:

representing energy at block (x, y) of the current frame as $E_{x,y}$; and wherein updating further comprises determining a change in energy distribution E' between the block (x, y) and block (i, j) in the previous frame as a function of:

$$E'_{x,y} = \frac{\sum_{i,j}(overlapS_{i,j,x,y} \times E_{i,j})}{W_b^2}, \ i,j \in [1, W_b]; \text{ and}$$

wherein overlap $S_{i,j,x,y}$ represents the overlap portion, the overlap portion being a rectangular region corresponding to block (i, j) and block (x, y), $W_b$ representing block size.

22. The computing device claim 20, wherein the computer-executable instructions for deriving and/or updating further comprise instructions for:

determining that a block of the frames is not in a frame boundary; and responsive to the determining, placing the block within the frame boundary by decreasing a magnitude of a corresponding motion vector field.

23. The computing device of claim 20, wherein the computer-executable instructions for motion filtering further comprise instructions for applying a weighting matrix of values designed to identify a particular type of motion to the energy redistributions.

24. The computing device of claim 20, wherein the computer-executable instructions for motion filtering further comprises instructions for applying a motion filter designed to identify a particular type of motion to the energy redistributions, each motion filter being a respective weighting matrix of values, elements of each weighting matrix being denoted as $w_{i,\ i}$; the applying comprising calculating a respective energy redistribution measurement from respective ones of the frames such that resulting temporal energy responses $E_R$ are determined according to:

$$E_R = \sum_{i,j} E_{i,j} \times w_{i,j} \quad i, j \in [1, W_b]; \text{ and}$$

wherein, $E_{i,j}$ denotes the energy distributed in each block (i, j), and $W_b$ represents block size.

25. The computing device claim 20, wherein the computer-executable instructions for motion filtering further comprise instructions for:
  identifying, for each motion filter of one or more motion filters, a respective mean energy value of a sequence of the temporal sequences associated with the motion filter;
  combining respective mean energy values to create an n-dimensional observation vector; the n-dimensional observation vector representing energy redistribution responses to each of the motion filters and original input and difference temporal sequences.

26. The computing device of claim 25, wherein the computer-executable instructions further comprise instructions for analyzing the n-dimensional observation vector with a statistical sequential pattern analysis tool to map the motion patterns to semantic events associated with the video frames.

27. The computing device claim 26, wherein statistical sequential pattern analysis tool is based on Hidden Markov Models.

28. A computing device for representing sequential motion patterns, the computing device comprising:
  means for converting video frames into a sequence of energy redistribution ("ER") measurements;
  means for applying one or more motion filters to the ER measurements to generate a number of temporal sequences of motion patterns, the motion patterns being in a spatio-temporal data format, the number being a function of how many motion filters were applied to the ER wherein the means for converting further comprises means for determining a change in energy distribution between multiple ones of the video frames via respective motion vector fields (MVFs).

29. The computing device of claim 28, further comprising:
  for each motion filter, means for identifying a respective mean energy value of a temporal sequence associated with the motion filter; and
  means for combining respective mean energy values to create an n-dimensional observation vector; the n-dimensional observation vector representing ER responses to each of the motion filters and original input and difference temporal sequences.

30. The computing device claim 28, further comprising means for analyzing the n-dimensional observation vector with a statistical sequential pattern analysis tool to map the motion patterns to semantic events associated with the video frames.

* * * * *